(12) United States Patent
Duewer (10) Patent No.: US 7,248,186 B1
(45) Date of Patent: Jul. 24, 2007

(54) NOISE MANAGEMENT METHOD AND CIRCUITS SUITABLE FOR UTILIZATION IN CIRCUITS AND SYSTEMS HAVING A SWITCHED DATA PORT

(75) Inventor: Bruce Eliot Duewer, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 109 days.

(21) Appl. No.: 11/086,942

(22) Filed: Mar. 22, 2005

(51) Int. Cl.
*H03M 7/00* (2006.01)
(52) U.S. Cl. .......................................... 341/50; 713/400
(58) Field of Classification Search ................ 341/50, 341/100, 101; 711/167; 713/600, 400
See application file for complete search history.

(56) References Cited

U.S. PATENT DOCUMENTS

| | | | |
|---|---|---|---|
| 6,473,731 B2 * | 10/2002 | Hinderks | 704/200.1 |
| 7,000,138 B1 * | 2/2006 | Pillay et al. | 713/600 |
| 2004/0193821 A1 * | 9/2004 | Ruhovets et al. | 711/167 |

* cited by examiner

*Primary Examiner*—Rexford Barnie
*Assistant Examiner*—Joseph Lauture
(74) *Attorney, Agent, or Firm*—Thompson & Knight LLP; James J. Murphy (57) ABSTRACT

A method of reducing noise in a system utilizing a serial port includes generating a data word having a selected number of bits and ensuring that a last bit of the data word corresponds to a first bit of a next data word. The data word is output through the serial port and the next data word switched for output through the serial port in response to an event.

20 Claims, 6 Drawing Sheets

NOISE MANAGEMENT METHOD AND CIRCUITS SUITABLE FOR UTILIZATION IN CIRCUITS AND SYSTEMS HAVING A SWITCHED DATA PORT

FIELD OF INVENTION

The present invention relates in general to data processing techniques, and in particular, to noise management methods and circuits suitable for utilization in circuits and systems having a switched data port.

BACKGROUND OF INVENTION

Many audio applications, such as audio analog to digital converters (ADCs) and audio encoder—decoders (CO-DECs), utilize a serial data port to transmit digitized audio data to other devices in a system. A typical audio serial data output port outputs bits of a serial audio data (SDOUT) stream in response to an associated serial clock (SCLK) signal. In a stereo system, two channels of audio data are time-multiplexed onto the SDOUT stream with a left-right clock (LRCK) signal. Overall timing is controlled by a master clock (MCLK) signal. At the integrated circuit level, the utilization of a serial port advantageously minimizes the number of pins and associated on-chip driver circuitry.

A typical serial data port operates in either a master mode or a slave mode. In the master mode, the SCLK and LRCK clock signals are generated internally, in response to a received MCLK signal, and output to the destination of the SDOUT stream. In the slave (asynchronous) mode, the SCLK and LRCK clock signals are received from the destination of the SDOUT stream, and therefore may have arbitrary phase relationships with the MCLK signal.

In an ADC, the analog input signal is typically sampled on corresponding rising edges of an internal MCLK clock signal, while data are output on the following edges of the SCLK signal. One frequent problem experienced with ADC serial output ports is the coupling of digital noise into the device substrate from the serial output driver at the SDOUT output, especially when the SDOUT output is driving a relatively high load. For example, if a bit of the SDOUT stream is output on a falling edge of the SCLK clock signal occurring slightly before the next sample of the analog input is taken with the next rising edge of the MCLK signal, digital noise will couple into the ADC analog circuitry through the chip substrate or metal lines.

In the past, the problem of substrate noise generated by the SDOUT output driver has been addressed by re-timing the SCLK clock signal relative to the MCLK clock signal, such that the SDOUT output switching and analog input sampling operations are separated sufficiently in time to prevent digital noise in the substrate from being captured by the analog circuitry. However, in the slave mode, in which the SCLK signal is typically received with an arbitrary phase relationship with the external and/or internal MCLK signals, re-timing is often not possible. In particular, for higher frequency SCLK signals, the timing window between the SCLK signal and the internal MCLK signal may be too small to meet device operating parameters, such as set-up time.

The problem of noise management is compounded when the LRCK signal is taken into account. Depending on the value of the last bit of the current channel and the first bit of the following channel, switching events at the SDOUT pin triggered by LRCK clock signal can cause a noise-generating transition in the state of the SDOUT output driver. For example, if the last bit of the current channel is in a logic low state and the first bit of the following channel is in a logic high state, then on the transition of the LRCK signal, the output driver at the SDOUT pin will transition from sinking to sourcing current, thereby generating noise which can couple through the substrate and/or the device metal lines.

Given the prevalence of serial ports in many data processing applications, and the general goal of minimizing noise within individual devices and the overall system, new noise management techniques suitable for serial port applications are desirable. In particular, these techniques should help minimize noise occurring at transitions of a sampling clock, such as the LRCK signal commonly used in audio applications. Consequently, the noise management task may be focused on addressing noise caused by events triggered the associated serial clock signal.

SUMMARY OF INVENTION

The principles of the present invention are embodied, for example, in a method of reducing noise in a system utilizing a serial port and includes generating a data word having a selected number of bits and ensuring that last bit of the data word corresponds to a first bit of a next data word. The data word is output through the serial port and the next data word switched for output through the serial port in response to a corresponding event.

Embodiments of the present principles are suitable, for example, in circuits and systems in which two or more data streams are switched in response to an edge of a control signal and it is desirable to minimize noise during that switching. In one particular representative application of the inventive principles, the data word includes a sample and one additional bit. The additional bit is set to the value of the first bit of the next data word and a selected logic value is selectively subtracted from the least significant bit of the data sample, such that inter-channel interference is minimized. In another particular representative embodiment, the data word is rounded such that a last bit in the resulting rounded data word is equal in value to the first bit of the next data word. Any noise generated during rounding is uncorrelated between those data words and typically within the system noise floor.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION OF THE INVENTION

The principles of the present invention and their advantages are best understood by referring to the illustrated embodiment depicted in FIGS. 1-4 of the drawings, in which like numbers designate like parts.

Figure 1:
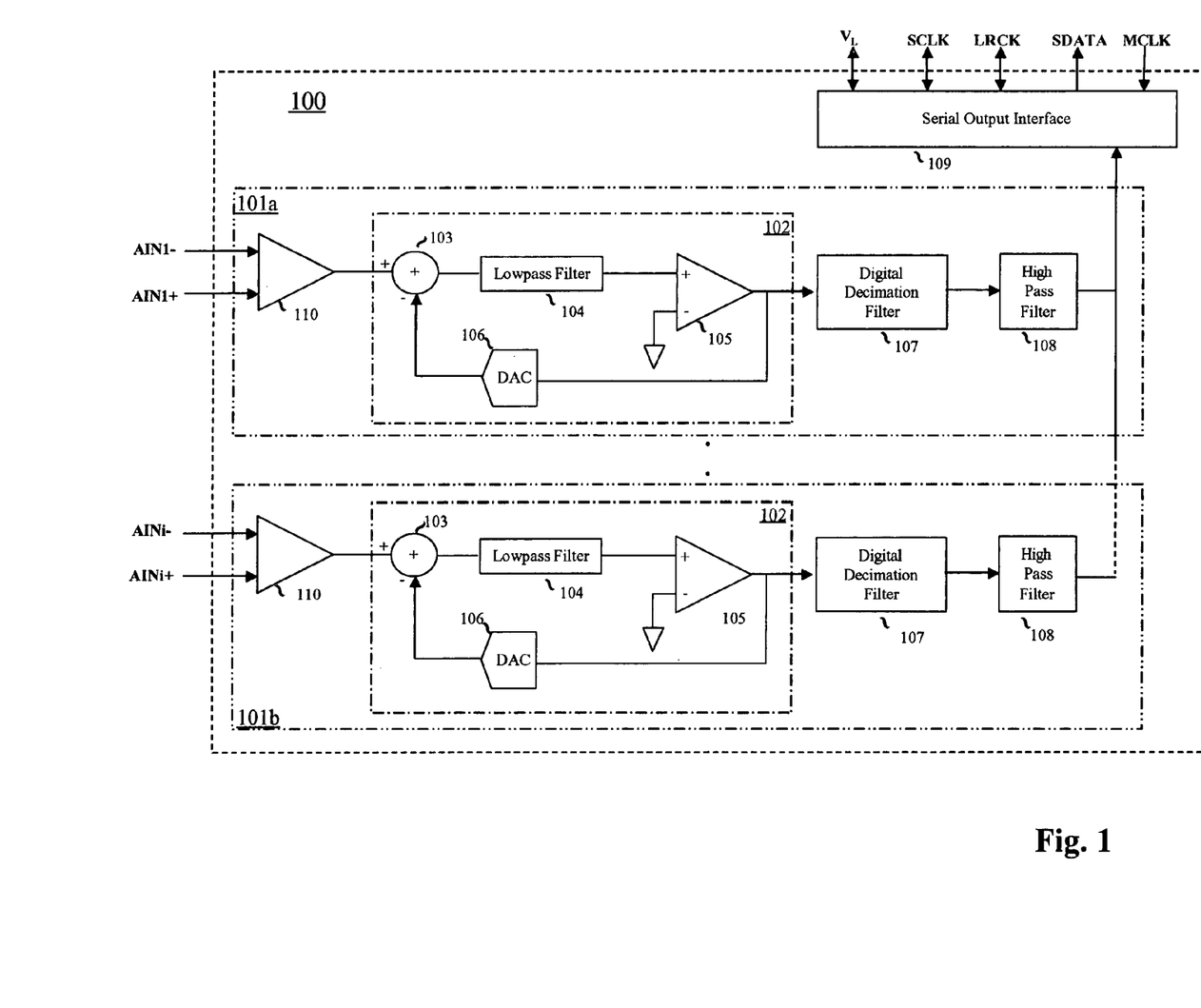
FIG. 1 is a high level block diagram of an exemplary audio analog to digital converter (ADC) suitable for describing one application of the principles of the present invention.

FIG. 1 is a high level operational block diagram of a single-chip audio analog-to-digital converter (ADC) 100 suitable for describing the principles of the present invention. ADC 100 is only one of a number of possible applications in which the principles can advantageously be utilized; other examples include general purpose ADCs, digital to analog converters (DACs), and encoder-decoders (Codecs).

ADC 100 includes n-number of conversion paths, of which 101a and 101b are shown for reference, for converting n-number of channels of analog audio data respectively received at left and right analog differential inputs AlNi+/−, where i is the channel number from 1 to n. The analog inputs for each channel in the illustrated embodiment are passed through an input gain stage 110 and then to a delta-sigma modulator 102.

Each delta-sigma modulator 102 is represented in FIG. 1A by a summer 102, low-pass filter 104, comparator (quantizer) 105 and a DAC 106 in the feedback loop. The outputs from each delta-sigma modulator 102 is passed through a decimation filter 107, which reduces the sample rate, and a high pass filter 108.

The resulting digital audio data are output through a single serial port SDOUT of serial output interface 109, timed with a serial clock (SCLK) signal and a left-right clock (LRCK) signal. In the slave mode, the SCLK and LRCK signals are generated externally and input to ADC 100. In the master mode, the SCLK and LRCK signals generated on-chip, along with the associated data, in response to a received master clock MCLK.

Figure 2:
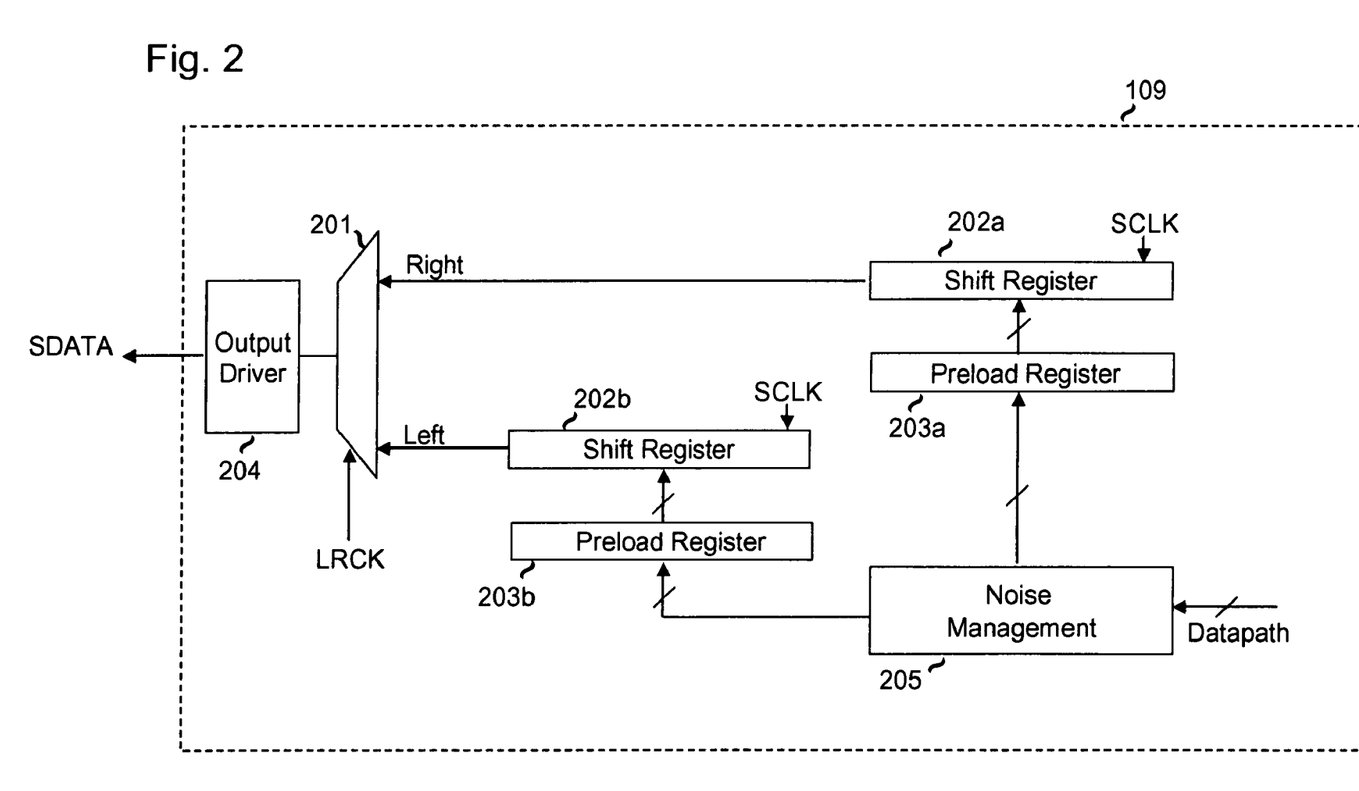
FIG. 2 is a more detailed block diagram of the serial output interface depicted in FIG. 1.

FIG. 2 is a conceptual block diagram illustrating the SDOUT output port circuitry of serial output interface 109 of FIG. 1. In the exemplary two-channel embodiment of FIG. 2, each edge of the LRCK signal switches one of the time-multiplexed left and right channels of stereo audio serial data to the output of a multiplexer 201. In particular, the bits of each sample of right channel audio data, along with any trailing bits, are shifted to the SDOUT output from a shift register 202a in response to the SCLK clock signal. Similarly, the bits of each sample of left channel audio data, and each trailing bit, if any, is shifted by the SCLK clock signal from a shift register 202b. Audio samples are loaded into shift registers 202a and 202b in parallel from corresponding preload registers 203a and 203b. An output driver 204 drives the SDOUT output.

According the principles of the present invention serial output interface 109 includes noise management circuitry 205, the operation of which is described in detail below. In general, noise management circuitry 205 ensures that the inputs to multiplexer 201 have an equal logic value at the edges of the LRCK signal. Consequently, no transition in the SDOUT output stream occurs when multiplexer 201 switches, and as a result, output driver 204 does not switch from one current sourcing or sinking state to the other. The problem of noise correlated to the edges of LRCK signal is minimized, such that noise management efforts may be focused on retiming with respects to the SCLK signal alone.

Figure 3A:
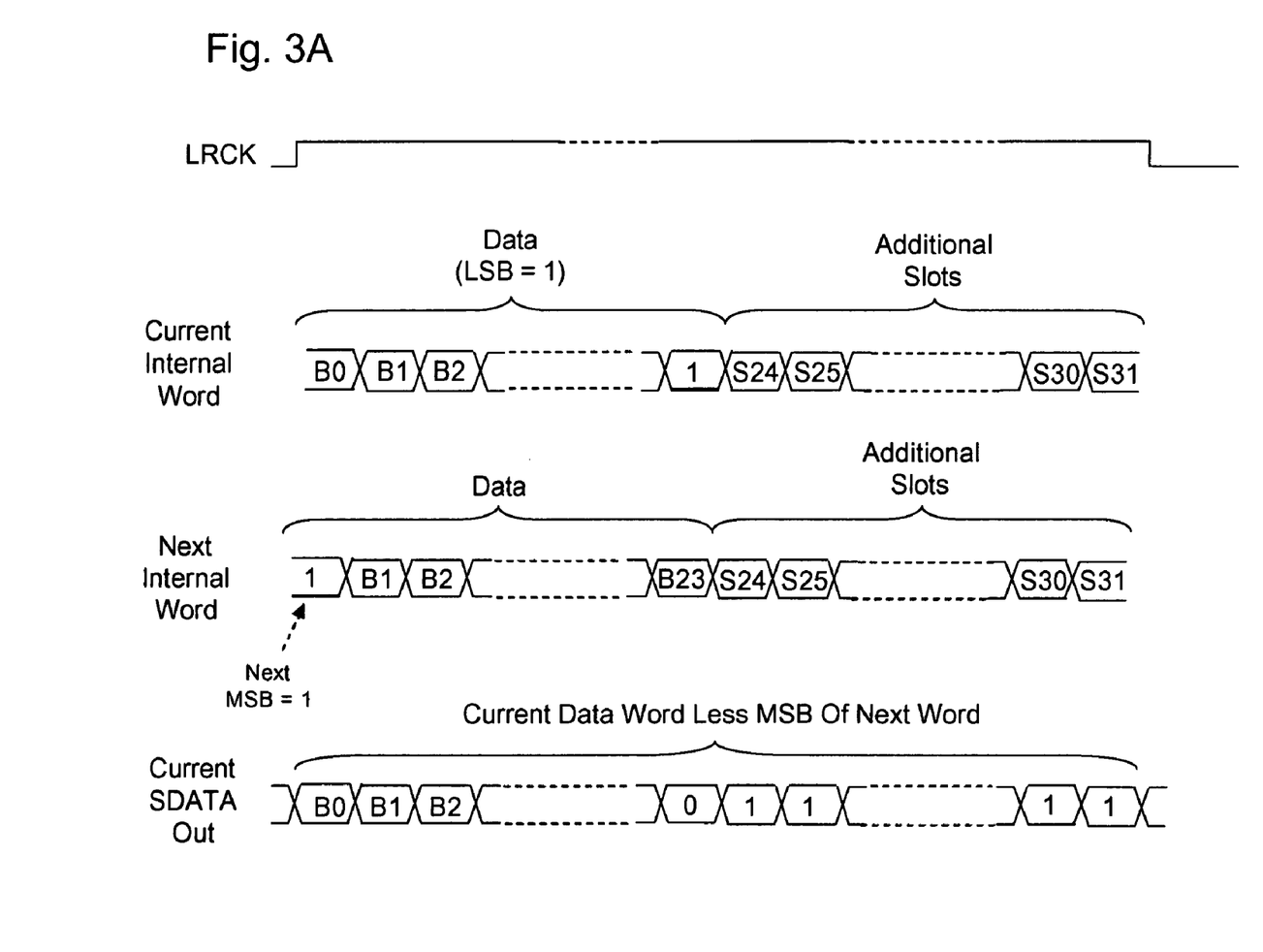
FIGS. 3A and 3B are timing diagrams illustrating one representative noise management method according to the principles of the present invention.
Figure 3B:
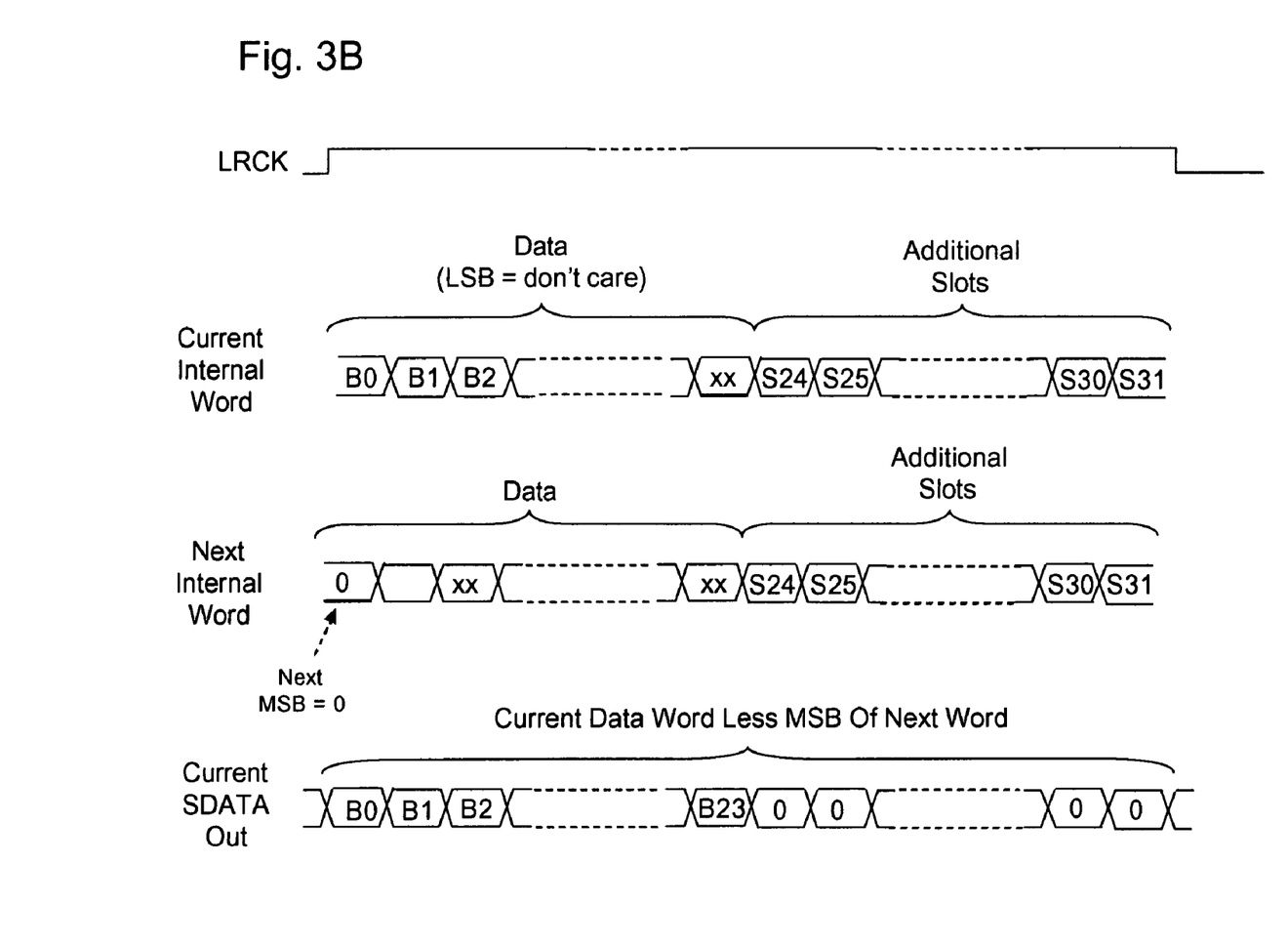

FIGS. 3A and 3B are a timing diagrams illustrating a first technique for minimizing the generation of on-chip noise during transitions of the LRCK signal. Generally, this technique prevents data transitions at the SDOUT port on the edges of the LRCK signal by forcing the outputs from shift registers 202a and 202b to be at the same logic level when multiplexer 201 switches. Consequently, SDOUT output driver circuitry 204 does not switch between current sourcing and current sinking states, or vice versa, and thereby inject noise into the chip substrate. Additionally, the inventive principles embodied in the example shown in FIGS. 3A AND 3B minimize inter-channel interference which occurs when one or more bits of the current data stream are modified to force the last bit of that current data stream to the equivalent logic state as the first bit of the next data stream.

In the example shown in FIGS. 3A and 3B, the audio samples are each twenty four (24) bits wide and shifted out of the SDOUT port in transmission period of thirty two (32) time slots defined by the logic high phase of LRCK signal and the corresponding thirty two (32) periods of the SCLK clock signal. In particular, each 24-bit audio sample is in a left-justified or 12C format, with the first twenty four (24) time slots (B0-B23) carrying the twenty four (24) bits of the data sample, and the remaining eight (8) time slots (S24-S31) carry trailing bits beyond the sample length, as discussed further below. Hence, in this example, each data word output in the SDOUT stream during each high and low phase of LRCK signal includes a 24-bit wide data sample and eight (8) trailing bits. In the left-justified (12C) format, the first bit (B0) of each sample is the most significant bit (MSB) and bit B23 represents the least significant bit (LSB).

FIG. 3A illustrates the case in which bit B0 (the MSB) of the next sample in the SDOUT stream has a logic 1 value. According to the embodiment of the inventive principles illustrated in FIG. 3A, the eight (8) trailing bits are all set to zero and a logic 1 value is subtracted from the entire data word including the twenty four (24) bits of the data sample and the eight (8) trailing bits. Consequently, in the case of FIG. 3A, both inputs to multiplexer have a logic 1 value prior the next edge of the LRCK signal, such that when multiplexer 201 switches with the arrival of that edge, output driver 204 does not change state to generate the next bit of the SDOUT output stream. Advantageously, if the device or system receiving the SDOUT output data stream is observing all thirty two (32) slots of each transmission period, the inter-channel error introduced by the technique shown in FIG. 3A is only equivalent to the error introduced by the logic 1 value set in slot S31, or $2^{-32}$ of the sample value. If the device or system receiving the SDOUT data is only monitoring the twenty four (24) bits of the actual data sample, then the inter-channel error is the error in bit B23, or $2^{-24}$, which is still acceptable, although significantly larger.

FIG. 3B illustrates the related case in which the MSB of the next sample has a logic 0 value. In the example of FIG. 3B, the current additional slots S24-S31 are again are padded with logic trailing bits with a logic 0. In this case, since the MSB is a logic 0, the current data word, including the twenty four (24) bits of the data sample and the eight (8) trailing bits, remains unchanged. Here, both inputs to multiplexer 201 have a logic 0 at the arrival of the next edge of the LRCK signal, such that output driver 204 continues to drive a logic 0 value output after multiplexer 201 switches. Since only logic 0 values are padded into unused slots S24-S31, no inter-channel error is introduced into the current data sample.

The technique illustrated in FIGS. 3A and 3B may be generalized to larger sample sizes. For example, in system in which the receiving device or system is monitoring a forty eight (48) slot transmission period, the error is reduced to the value of the forty-eight ($48^{th}$) slot, or $2^{-48}$ of the sample value. Generally, the more bits in the data word, the smaller the inter-channel interference which results. Furthermore, If the device for system receiving the SDOUT output stream continues to request additional LSBs from the current channel, the LSB of the current data word is simply repeated until the receiving device or system sends a requests the MSB. In this case, the inter-channel interference error is further reduced.

Figure 4A:
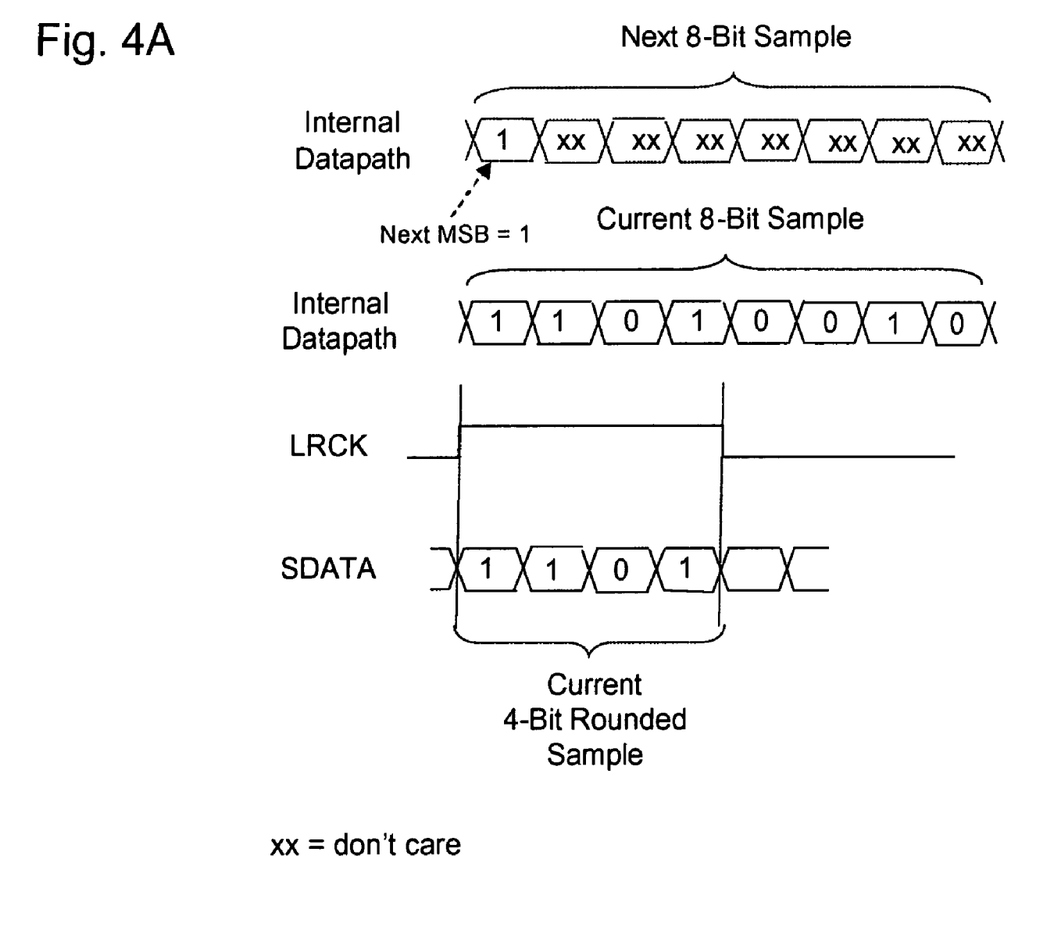
FIGS. 4A and 4B are timing diagrams illustrating a second representative noise management method according to the principles of the present invention.
Figure 4B:
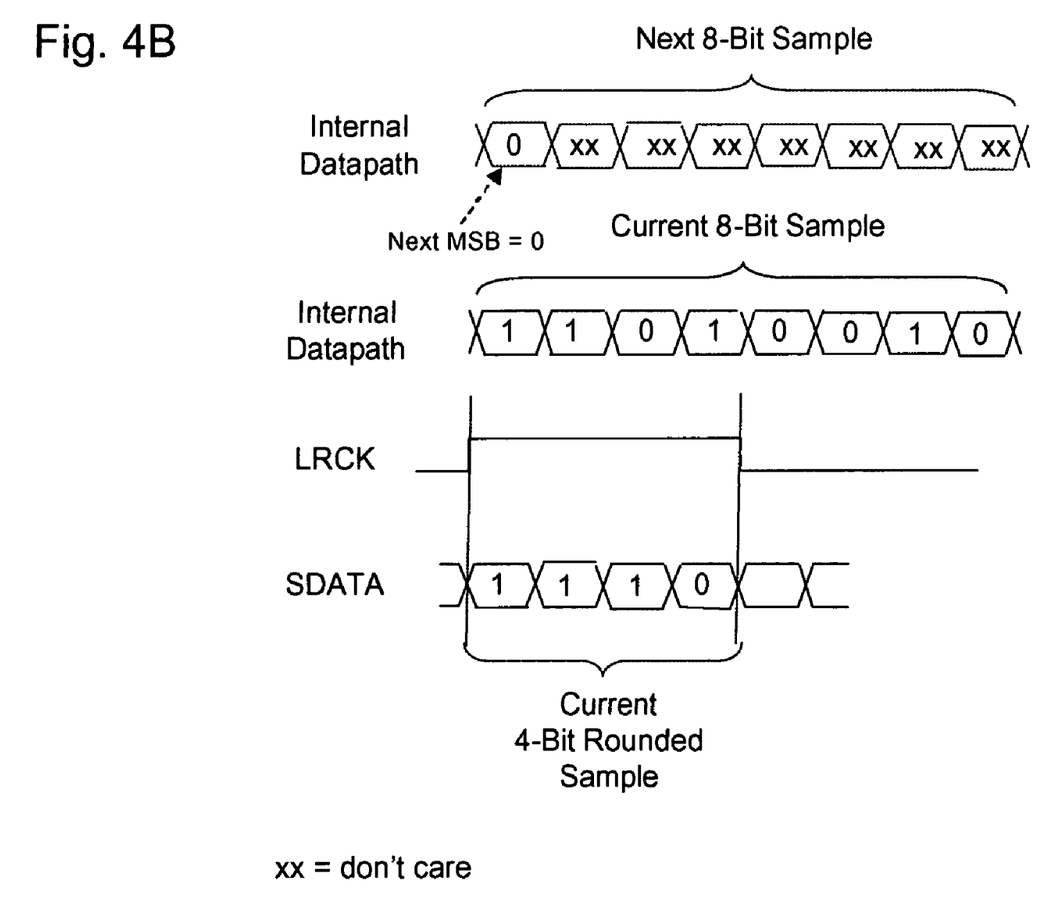

FIGS. 4A and 4B are timing diagrams illustrating a second technique for minimizing the generation of on-chip noise during transitions of the LRCK signal. As with the embodiment of FIGS. 3A and 3B, the embodiment of FIGS. 4A and 4B ensures that the logic levels at the inputs to multiplexer 201 of FIG. 2 are equivalent during switching at the LRCK signal edge. Advantageously, the technique illustrated in FIGS. 4A and 4B does not introduce inter-channel interference.

In the example described in FIGS. 4A and 4B, the data path into noise management circuitry 209 is eight (8) bits wide and each data sample of the SDOUT output stream is rounded down to four (4) bits, for discussion purposes. Additionally, in the FIGS. 4A and 4B, it is assumed that the sample represents all time slots during the corresponding cycle of the LRCK signal. The principles of the present invention are equally applicable to wider internal data paths and wider output data samples. When the data sample has fewer bits than the number of slots available, as it was in the example described in FIGS. 3A and 3B, the unused slots may be padded with logic 0 values and the entire data word rounded as described below.

FIG. 4A illustrates an example in which the current (un-rounded) 8-bit data word on the internal data path has a value 11010010 and the MSB of the next 8-bit sample on the internal data path has a logic 1 value. According to the principles of the present invention, the 8-bit original value of the current data sample is rounded down such that the last bit (LSB) has a logic value equal to the logic value of the MSB of the next data sample, in this case a logic 1. The MSB of the next data sample does not determine if the direction of rounding is up or down, but only as to whether the LSB of the rounded current sample will take on a logic 1 or a logic 0 value. Instead, the direction of rounding is determined by whether rounding up or rounding down results in a rounded data sample which is closer to the value of the original unrounded current sample. Therefore, in the present example, the original data sample with a value 11010010 is rounded down to the value 1101, since the value 1101 is closer to the original value 11010010 than the value 1111.

In the example shown in FIG. 4B, the original data sample value is again 11010010; however, the MSB of the next data value is a logic 0. In this case, the value 1101010 is rounded up to the value 1110, since the rounded value 1110 is closer to the original value 11010010 than 1100.

Advantageously, the method illustrated in FIGS. 4A and 4B results in noise which is random in nature (e.g. white noise). In other words, the noise injected into the SDOUT data is uncorrelated between data samples, and depends only on the number of bits of rounding. For audio applications, this uncorrelated noise is typically within the noise floor of the given device or system.

The determination of the number of bits rounded to generate each rounded output sample in the SDOUT output stream depends on the desired quality of the ultimate output. In an audio system, such as system 100, one possible factor is the type and desired quality of the ultimate audible output. For a high quality audio output, the samples of the SDOUT output stream must be wider than those needed to generate a lower quality audio output. In each case, an estimation of the sample width is necessary. For example, rounding each audio sample in the SDOUT stream to too few bits results in noise and distortion in the audio output, as excessive information content is removed from the data sample. On the other hand, a failure to sufficiently round down the number of bits in each sample will appear as a truncation, which also will inject noise into the system.

Generally, the methods described in FIGS. 4A and 4B depends on a prediction of the length of the data words (i.e. the number of data bits) required by the receiving device. If the prediction is correct, and the output data is LSB-extended into slots which the receiving device does not require, the error is minimized If the receiving device monitors the LSB-extended slots, some error results; however, this error is still acceptable.

The exemplary embodiments of FIGS. 3A and 3B and FIGS. 4A and 4B eliminate data transitions at the SDOUT output pins of an audio serial port when switching between time-multiplexed audio samples in a single audio stream in response to a LRCK signal. However, the principles of the present invention are not limited thereto, and can be extended to any number of different applications in which it may be desirable to ensure a constant data value or voltage level at a data port during a switching event. For example, during the multiplexing or demultiplexing of multiple parallel data streams of data through a serial port or pin, it may be necessary to maintain a constant voltage at the associated pad during switching between streams to minimize noise. Additionally, the data port could be either an input port or an output port and the switching signal generated by either the source of the data streams or the destination of the data streams.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A method of reducing noise in a system utilizing a serial port comprising:
   generating a data word having a selected number of bits;
   selectively modifying a value of the data word to ensure that a last bit of the data word corresponds to a first bit of a next data word;
   outputting the data word through the serial port; and
   switching the next data word for output through the serial port in response to an event to generate a data stream in which the last bit of the data word is continuous with the first bit of the next data word.

2. The method of claim 1, wherein the event comprises an edge of a signal controlling switching of data words through the serial port.

3. The method of claim 1, wherein the next data word comprises a following data word in a time-multiplexed serial stream of data words.

4. The method of claim 1, wherein the data word comprises a data sample and at least one additional bit, wherein the at least one additional bit is the last bit of the data word.

5. The method of claim 1, wherein ensuring that the last bit of the data word corresponds to the first bit of the next data word comprises selectively subtracting a value of the first bit of the next word from the data word.

6. The method of claim 5, wherein the data word includes a data sample and at least one additional bit and ensuring that the last bit of the data word corresponds to the first bit of the next data word comprises selectively setting the additional bit to a selected value and subtracting a value of the first bit of the next data word from the data word.

7. The method of claim 1, wherein modifying the data sample comprises rounding a value of the data word to generate a rounded data word having a last bit set to the value of the first bit of next data word.

8. A data port comprising:

switching circuitry for switching between first and second data words, the first data word preceding the second data words in time, the switching circuitry outputting a data stream in which the first and second data words are continuous in time; and data processing circuitry for modifying a value of the first data word for ensuring that a selected bit of the first data word and a selected bit of the second data word are equal in state at a time of switching by the switching circuitry between the first data word and the second data word.

9. The data port of claim 8, wherein the data processing circuitry sets the logic value of a last bit of the first data word to the logic value of a first bit of the second sample and selectively modifies a selected number of bits of the first data word to reduce inter-channel noise.

10. The data port of claim 8, wherein the date processing circuitry rounds a value of the first data word such that a logic value of a last bit of the first data word is the same as the logic value of a first bit of the second data word.

11. The data port of claim 8, wherein each of the first and second data words comprise a data sample and a selected number of additional bits, a last one of the additional bits being the last bit of the data word.

12. The data port of claim 8, wherein the data port comprises a serial output port outputting data words in response to edge of a clock signal provided at the switching time of the switching circuitry.

13. The data port of claim 12, wherein the serial output port comprises an audio port and the clock signal comprises a left-right clock signal.

14. An audio system comprising:

audio processing circuitry; and an audio data port for exchanging audio data with other audio data processing circuitry, the audio data port outputting first and second data words which are continuous in time comprising:

switching circuitry for switching for output in response to a clock signal between the first and second data words, at least some of the bits of the first and second data words being audio data samples, and wherein the first data word precedes the second data word in time; and port control circuitry for modifying a value of the first data word for ensuring a last bit of the first data word and a first bit of the second data word are equal in state at a time of switching by the switching circuitry between the first data word and the second data word.

15. The audio system of claim 14, wherein the first and second data words each comprise an audio data sample and at least one additional bit, the at least one additional bit of the first data word being the last bit of the first data word.

16. The audio system of claim 14, wherein the switching circuitry switches in response to an asynchronous sampling clock received from another audio processing system.

17. The audio system of claim 14, wherein the audio processing circuitry comprises an analog to digital converter.

18. The audio system of claim 14, wherein the port control circuitry sets the logic value of last bit of the first data word to the logic value of the first bit of the second sample and selectively modifies a selected number of bits of the first data word to reduce inter-channel noise.

19. The audio system of claim 18, wherein the port control circuitry modifies a selected number of bits of the first data word by subtracting the logic value of the first bit of the second data word from a value of the first data word.

20. The audio system of claim 14, wherein the port control circuitry rounds a value of the first data word such that a logic value of the last bit of the first data word is the same as the logic value of the first bit of the second data word.

* * * * *